Feb. 22, 1938.    C. PRESS    2,109,091
BRAKE
Filed Oct. 19, 1936

INVENTOR.
CARL PRESS
BY J. R Cox
ATTORNEY.

Patented Feb. 22, 1938

2,109,091

UNITED STATES PATENT OFFICE 2,109,091

BRAKE

Carl Press, South Bend, Ind., assignor to Bendix Products Corporation, South Bend, Ind., a corporation of Indiana Application October 19, 1936, Serial No. 106,375

4 Claims. (Cl. 188—106)

This invention relates to internal expanding brakes.

An object of the invention is to provide an internal expanding brake having an auxiliary actuating means.

Another object of the invention is to provide a hydraulically actuated brake having an auxiliary actuated means.

Another object of the invention is to provide an exceedingly cheap and simple yet efficient brake wherein a braking element may be hydraulically actuated as a service brake and the same element may be operated by mechanical linkage as an emergency or parking brake.

A further object of the invention is to provide a brake structure having a friction element adapted to be effectively actuated as a service brake by a floating fluid pressure actuated motor which may also be employed as a rigid unit in a mechanical linkage for actuating the same element as an emergency or parking brake.

A feature of the invention is a brake including a floating fluid pressure actuated motor supported by the friction elements of the brake and operative to actuate the friction elements, and an actuating lever pivoted on one of the friction elements and connecting the motor in a mechanical linkage for actuating the friction elements.

Further objects and advantages of the invention reside in the various combinations hereinafter described and claimed, as will be apparent upon reference to the following specification and to the accompanying drawing, in which,—

Figure 1:
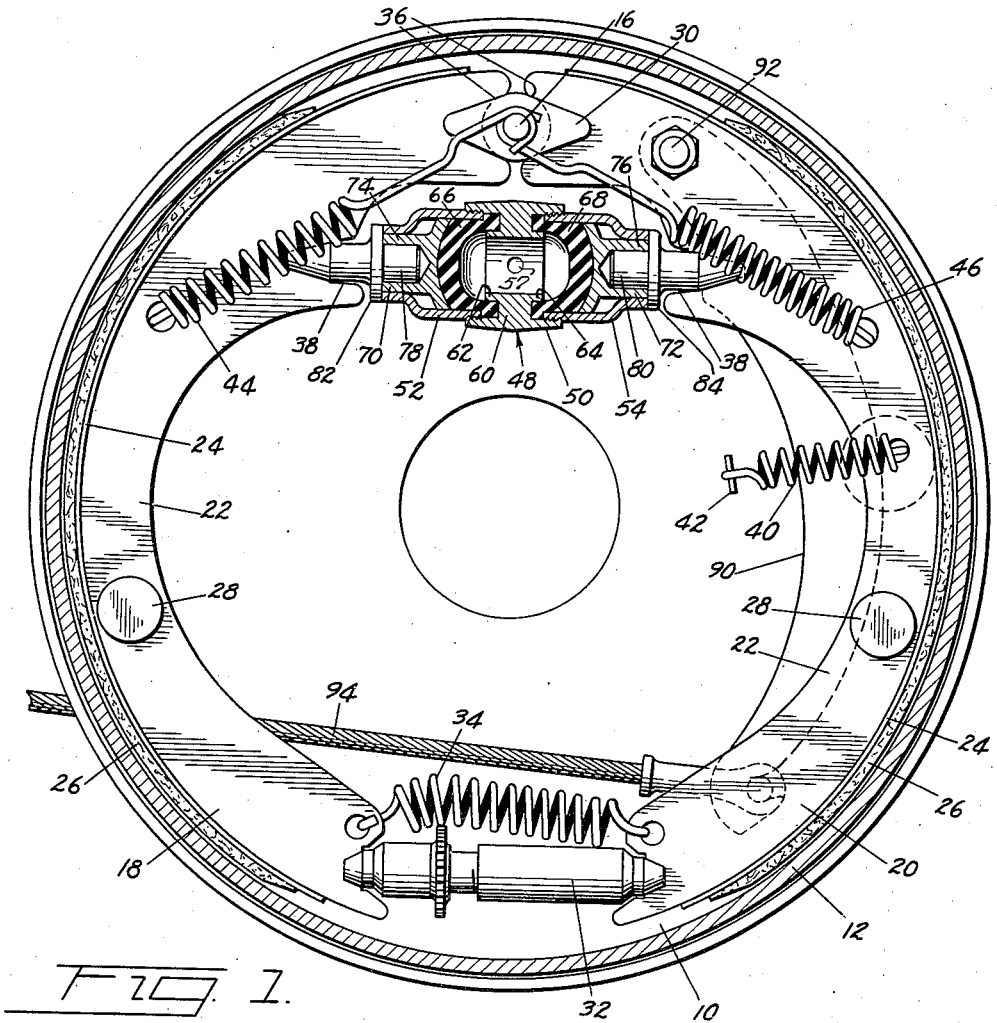
Figure 2:
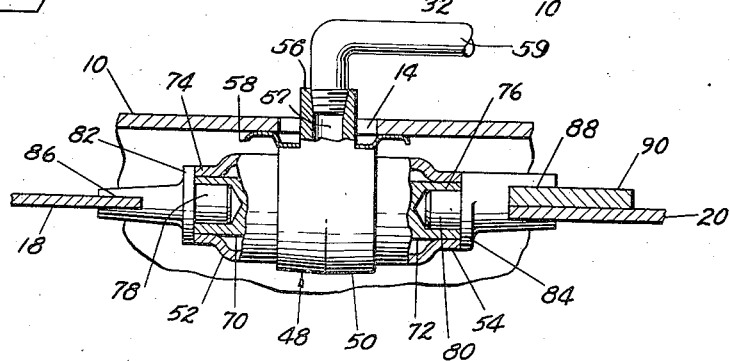

Fig. 1 is a vertical, sectional view of the brake structure embodying the invention; and Fig. 2 is a longitudinal, sectional view with parts broken away.

Referring to the drawing for more specific details of the invention, 10 represents a fixed support or backing plate of conventional type having associated therewith a rotatable drum 12, also of conventional type. The backing plate has an opening 14, the purpose of which will hereinafter appear, and suitably mounted on the backing plate above the opening is an anchor 16 of any preferred structure.

Positioned for movement on the backing plate is a frictional means including corresponding interchangeable articulated friction elements or shoes 18 and 20. The shoes are of conventional type each including a web 22 supporting a rim 24 having secured thereto a suitable friction lining 26 adaptable for cooperation with the braking surface of the drum. The shoes are retained on the backing plate by suitably steady rests 28, connected between the webs of the shoes and the backing plate, and a retaining shield 30 on the anchor engaging the webs of the shoes.

As shown, the articulate ends of the shoes are connected by an adjusting device 32 embracing the webs of the shoes, and this device is held against displacement by a tension spring 34 connected between the webs of the shoes. This spring also serves to retain the device in adjusted position. The separable ends of the shoes have their webs notched, as indicated at 36, for the reception of the anchor, and adjacent the separable ends of the shoes the webs are provided with oppositely disposed notches 38, the purpose of which will hereinafter appear.

The shoe is connected by a suitable return spring 40 to a fixed support 42 on the backing plate, and the shoes 18 and 20 are respectively connected by suitable retractile springs 44 and 46 to the anchor. Preferably the spring 44 has less tensional strength than the spring 46, so that upon operation of the actuating means the shoe 18 will move from its anchor in advance of any movement of the shoe 20.

The actuating means includes a floating fluid pressure actuated motor 48 supported by the shoes 18 and 20. This motor comprises a cylinder including a relatively short central section 50 having threaded in its respective ends oppositely disposed double diametral end sections 52 and 54. The center section 50 is provided with a boss 56 normal to the cylinder in which is drilled a hole 57 communicating with the interior of the cylinder for the attachment of a flexible pressure delivery pipe or tube 59.

The boss 56 extends through the opening 14 in the backing plate and a shield 58 supported on the sleeve slidably engages the backing plate and bridges the opening so as to exclude dust and other foreign substances from the interior of the brake structure. The central section 50 of the cylinder has an internal radial portion 60 providing reversely disposed shoulders 62 and 64, each having an annular groove. A pair of flexible cup-shaped diaphragms 66 and 68 arranged in reverse position to one another have their respective rims fitted in grooves in the shoulders 62 and 64 and clamped against displacement by the inner ends of the end sections 52 and 54.

Corresponding oppositely disposed pistons 70 and 72 reciprocable respectively in those portions of the end sections 52 and 54 of the cylinders having the larger diameter have their respective heads concave for the reception of the respective cup-shaped diaphragms 66 and 68, and concentric extensions 74 and 76 on their respective backs are slidable in those portions of the end sections 52 and 54 having the smaller diameter.

The extensions 74 and 76 are provided with concentric bores for the reception of thrust pins 78 and 80 having flanges 82 and 84 normally abutting the respective free ends of the end sections 52 and 54 of the cylinder, and the free ends of the thrust pins are bifurcated as at 86 and 88 for the reception of the webs of shoes 18 and 20.

In a normal operation of the brake as so far described, upon introducing fluid under pressure into the cylinder between the diaphragms 66 and 68, the pistons 70 and 72 are moved in opposite directions, and this movement of the pistons is transmitted through the thrust pins 78 and 80 to the shoes 18 and 20, resulting in moving the shoes into engagement with the braking surface of the drum against the resistance of the retractile springs 40, 44 and 46 to effectively resist rotation of the drum. At the conclusion of a braking operation, upon release of the pressure on the fluid in the cylinder the shoes 18 and 20 and the pistons connected to the shoes are returned to their retracted positions under the influence of the retractile springs 40, 44 and 46.

The operation hereinabove described is purely that of a hydraulically actuated service brake. The fundamental difference between the conventional hydraulically actuated service brake and the instant invention is embodied in the particular structure of the fluid pressure actuated motors 48 and the two-fold function of this motor.

In brake structures of this type and others having similar characteristics, it has been found highly desirable to provide an auxiliary actuated means so that the brake may be operated as an emergency or parking brake, and to this end there is provided an operating lever 90 pivoted to the shoe 20 as indicated at 92. This lever is received by the bifurcation 88 in the free end of the thrust pin 80 and has its fulcrum substantially on the axis of the thrust pin. As shown, the lever is flapped against the web of the shoe 20 and is held in close engagement therewith by the bifurcated end 88 of the thrust pin 80 so as to inhibit chatter. The motor in this instance constitutes a rigid member in a mechanical linkage which is in effect a toggle, and the force applying end of the lever 90 is connected by a suitable cable or rod 94 to an emergency or parking lever, not shown.

When the brake is operated as an emergency or parking brake, force is applied through the cable or rod 94 to the lever 90, and this force is transmitted from the lever to the shoe 20 and also from the lever through the floating motor 48, (which in this instance operates as a rigid unit in a mechanical linkage to the shoe 18), resulting in spreading the shoes 18 and 20 into engagement with the braking surface of the drum 12 against the resistance of the retractile springs 40, 44 and 46; and upon release of the applied force the shoes and lever are returned to their normal or off positions under the influence of the retractile springs.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A brake comprising a fixed support, a rotatable drum associated therewith, a pair of friction elements arranged on the support for cooperation with the drum, a primary actuating means for the friction elements including a floating motor suspended between the friction elements, and a secondary actuating means for the friction element comprising mechanical linkage including a lever pivoted on one of the elements and the motor movable bodily as a unit of the linkage, said lever being pivoted near one end of said element and extending to a point adjacent the other end of said element and engaging said motor intermediate its length.

2. A brake comprising a friction element having a web, a lever pivoted to the web, and a thrust member having a bifurcation receiving and retaining the web and the lever in close assembly.

3. A brake comprising a fixed support, a rotatable drum associated therewith, a pair of friction elements arranged on the support for cooperation with the drum, an anchor on said support separably engaged by one pair of adjacent ends of said friction devices, a thrust transmitting device between the other pair of adjacent ends of said friction devices, a hydraulic motor floatingly supported between the friction devices radially inward from the anchor having thrust pins operably engaging the friction elements respectively, a lever pivoted on one of the friction elements adjacent its anchored end and extending adjacent the other end of the friction element, said lever engaging intermediate its ends the respective thrust pin of said motor, and a flexible operating cable secured to said lever.

4. A brake comprising a fixed support, a rotatable drum associated therewith, a pair of friction elements arranged on the support for cooperation with the drum, said friction elements comprising a rim and a web, an anchor on said support separably engaged by one pair of adjacent ends of said friction devices, a thrust transmitting device between the other pair of adjacent ends of said friction devices, a hydraulic motor floatingly supported between the friction devices radially inward from the anchor having thrust pins having a bifurcation receiving and retaining the webs of the friction elements respectively, a lever pivoted on one of the friction elements adjacent its anchored end and extending adjacent the other end of the friction element, said lever also being received and retained intermediate its ends by the bifurcation of the respective thrust pin of said motor and a flexible operating cable secured to said lever.

CARL PRESS.